United States Patent
Proulx et al.

(10) Patent No.: US 11,816,029 B2
(45) Date of Patent: Nov. 14, 2023

(54) ADJUSTMENT OF GARBAGE COLLECTION PARAMETERS IN A STORAGE SYSTEM

(71) Applicant: NetApp, Inc., San Jose, CA (US)

(72) Inventors: Alyssa Proulx, Boulder, CO (US); Wei Sun, Boulder, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/691,588

(22) Filed: Mar. 10, 2022

(65) Prior Publication Data
US 2022/0197789 A1 Jun. 23, 2022

Related U.S. Application Data

(63) Continuation of application No. 16/856,228, filed on Apr. 23, 2020, now Pat. No. 11,288,186.

(51) Int. Cl.
*G06F 12/02* (2006.01)
*G06F 12/0864* (2016.01)
*G06F 11/30* (2006.01)

(52) U.S. Cl.
CPC ...... *G06F 12/0253* (2013.01); *G06F 11/3006* (2013.01); *G06F 11/3037* (2013.01); *G06F 12/0246* (2013.01); *G06F 12/0864* (2013.01)

(58) Field of Classification Search
CPC ............ G06F 12/0253; G06F 12/0246; G06F 12/0864; G06F 11/3006; G06F 11/3037
See application file for complete search history.

(56) References Cited

U.S. PATENT DOCUMENTS

| | | |
|---|---|---|
| 9,634,992 B1 | 4/2017 | Rostamabadi et al. |
| 10,452,297 B1* | 10/2019 | Karr .................... H03M 7/3091 |
| 10,846,301 B1* | 11/2020 | Jia ........................... G06F 17/18 |
| 2007/0174370 A1* | 7/2007 | Detlefs ............... G06F 12/0276 |
| | | 711/E12.012 |
| 2008/0154852 A1 | 6/2008 | Beyer et al. |
| 2013/0246580 A1 | 9/2013 | Ozawa et al. |
| 2015/0309746 A1* | 10/2015 | Fornander ............... G06F 3/061 |
| | | 711/114 |
| 2017/0124138 A1 | 5/2017 | Mandagere et al. |
| 2019/0294990 A1* | 9/2019 | Lopez De Prado .. G06F 17/153 |

(Continued)

OTHER PUBLICATIONS

International Search Report and Written Opinion for Application No. PCT/US2021/028657 dated May 13, 2021, 13 pages.

*Primary Examiner* — Nanci N Wong
(74) *Attorney, Agent, or Firm* — Jaffery Watson Mendonsa & Hamilton LLP

(57) ABSTRACT

A system, method, and machine-readable storage medium for performing garbage collection in a distributed storage system are provided. In some embodiments, an efficiency level of a garbage collection process is monitored. The garbage collection process may include removal of one or more data blocks of a set of data blocks that is referenced by a set of content identifiers. The set of slice services and the set of data blocks may reside in a cluster, and a set of probabilistic filters (e.g., Bloom filters) may indicate whether the set of data blocks is in-use. At least one parameter of a probabilistic filter of the set of probabilistic filters may be adjusted (e.g., increased or reduced) if the efficiency level is below the efficiency threshold. Garbage collection may be performed on the set of data blocks in accordance with the set of probabilistic filters.

19 Claims, 9 Drawing Sheets

(56) References Cited

U.S. PATENT DOCUMENTS

| | | |
|---|---|---|
| 2020/0250148 A1* | 8/2020 | Dayan ........................ G06F 7/14 |
| 2020/0327050 A1* | 10/2020 | Danilov ................... G06F 3/064 |
| 2020/0387308 A1 | 12/2020 | Volkov et al. |
| 2020/0401515 A1 | 12/2020 | Liang et al. |

* cited by examiner

400

| 1 402 | 0 | 0 | 0 | 0 |
| 0 | 0 | 0 | 1 404 | 1 |
| 1 406 | 1 | 0 | 0 | 0 |
| 1 | 1 | 0 | 1 | 1 |

FIG. 4

ADJUSTMENT OF GARBAGE COLLECTION PARAMETERS IN A STORAGE SYSTEM

CROSS-REFERENCE TO RELATED APPLICATIONS

This application is a continuation of U.S. patent application Ser. No. 16/856,228, filed Apr. 23, 2020, now U.S. Pat. No. 11,288,186, the contents of which are hereby incorporated by reference in their entirety for all purposes

FIELD

The present description relates to data storage systems, and more specifically, to a system, method, and machine-readable storage medium for improving system operation by improving the performance of garbage collection to recover storage segments as free space.

BACKGROUND

A plurality of storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. For example, the metadata may describe, e.g., identify, storage locations on the devices for the data. The data of each volume may be divided into data blocks. The data blocks may be distributed in a content driven manner throughout the nodes of the cluster.

A client may write data to, read data from, and/or delete data stored in the distributed storage system. Data may be deleted from the system when a client address at which the data is stored is overwritten with other data or when a client address becomes invalid (e.g., a file or object is deleted). A garbage collection process may remove data that is no longer in use from the distributed storage system. There is not a one-to-one mapping, however, between the client addresses and stored data blocks because multiple client addresses may have the same data block referenced by the same block identifier. It may be desirable for the system to only delete data that is no longer needed. For example, a data block should not be deleted if it is being referenced by another client address.

BRIEF DESCRIPTION OF THE DRAWINGS

The present disclosure is best understood from the following detailed description when read with the accompanying figures.

FIG. 4 illustrates an example bloom filter in accordance with one or more aspects of the present disclosure.

DETAILED DESCRIPTION

Figure 1:
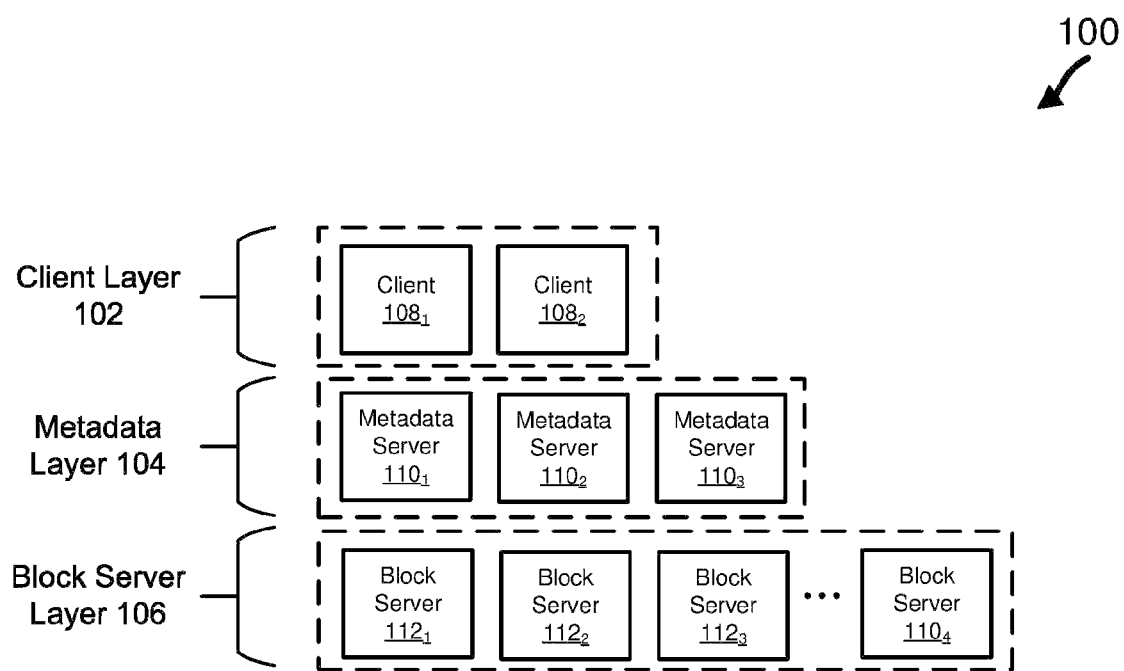
FIG. 1 illustrates a system for a distributed data storage system according to one or more aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, particular features described in relation to one aspect or embodiment may be applied to other disclosed aspects or embodiments of the disclosure, even though not specifically shown in the drawings or described in the text.

A distributed storage system may include one or more storage nodes, and each storage node may include one or more slice services. In the present disclosure, "slice service" may be used interchangeably with "metadata service". A slice service may refer to metadata for a volume of data and/or references to data blocks that compose the volume. Each slice service may include one or more volumes, and a client may store data to multiple volumes, retrieve data from multiple volumes, and/or modify data stored on multiple volumes. A client may write data to, read data from, and/or delete data stored in the distributed storage system. A garbage collection process may remove data that is no longer in use from the distributed storage system. A slice service may transmit a set of one or more bloom filters to a block service to indicate to the block service whether a data block referenced by the block service is in-use or not in-use. A bloom filter is a type of bit field that may be used for membership testing. For example, a bloom filter may indicate whether a set of data blocks is in-use or is not in-use. In a bloom filter, a data block that is in-use is marked as in-use, and a data block that is not in-use is marked either as in-use or as not in-use. Accordingly, use of the bloom filter may provide for a false positive, but not a false negative. The block service receives the set of bloom filters and performs garbage collection based on the set of bloom filters. For example, the block service may remove data blocks that are indicated as not in-use and may leave data blocks that are indicated as in-use. The bloom filter may have various parameters, such as a size of the bloom filter (e.g., a total number of bits in the bloom filter), a target fullness of the bloom filter (e.g., a total number of bits that is set to 1), and a number of hash functions used when constructing the bloom filter.

As more data is stored in the distributed storage system and/or clients have a greater number of nodes on a single cluster, it may be desirable to dynamically monitor and dynamically control the garbage collection process to ensure that an efficiency level of the garbage collection process does not fall below an efficiency threshold. The efficiency threshold may have an inverse relationship with the false-positive rate. For example, it may be desirable to ensure that the false-positive rate level of the garbage collection process does not rise above the false-positive rate threshold. The false-positive rate and the efficiency level may add up to one-hundred percent.

The present disclosure provides a content manager that monitors an efficiency level of a garbage collection process, which may include one or more rounds of garbage collection. The content manager may dynamically monitor the efficiency level using a bloom filter or an efficiency set for each round of garbage collection and may determine, for the round of garbage collection, a false-positive rate for a set of slice services based on monitoring the efficiency level. For example, the content manager may monitor the efficiency of a round of garbage collection by using one of several methods, which may include the efficiency sets to determine the false-positive rate, or by analyzing the Bloom filters themselves, either by assuming they are independent or by applying them to a random set of data. Each bloom filter may have a false-positive rate, and the content manager may determine the overall false-positive rate for a round of garbage collection based on the false-positive rates of the individual bloom filters. The overall false-positive rate for a round of garbage collection may be higher than the false-positive rate of each of the individual bloom filters.

In some examples, the content manager may control, based on the efficiency level, the garbage collection process by dynamically adjusting one or more of the bloom filters (e.g., reducing or increasing a size of the filter or a target fullness of the filter), with each round of garbage collection. For example, for one or more rounds of garbage collection, the content manager may adjust one or more of the filter parameters. For example, it may be desirable for the content manager to adjust one or more filter parameters if the content manager detects that the efficiency level is below an efficiency threshold, potentially resulting in a higher efficiency garbage collection. Trade-offs may exist between improving the false-positive rate and system performance. For example, increasing the filter size may result in a penalty in terms of memory consumption (e.g., consumes more memory) and communication (e.g., uses higher bandwidth). In some examples, it may be desirable for the content manager to adjust one or more filter parameters if the content manager detects heavy load on the system (e.g., memory and/or network constraints), potentially resulting in a lower efficiency garbage collection.

Aspects of the present disclosure can provide several benefits. For example, aspects may provide for reducing the false-positive rate of data that has been marked as in-use, but is actually not in-use. Accordingly, a large amount of data that would have remained on the system and falsely identified as in-use may be recycled and used for other purposes. Aspects may also provide for a higher efficiency garbage collection process that results in fewer rounds of garbage collection because more data is identified per round of garbage collection compared to other garbage collection processes. Aspects may also provide for balancing trade-offs between system performance and garbage collection, allowing for a more robust system performance and a better user experience.

FIG. 1 illustrates a system 100 for a distributed data storage system according to one or more aspects of the present disclosure. The system 100 includes a client layer 102, a metadata layer 104, and a block server layer 106. The client layer 102 includes clients $108_1$ and $108_2$ in the illustrated example. The metadata layer 104 includes metadata servers $110_1$, $110_2$, and $110_3$ in the illustrated example. The block server layer 106 includes block servers $112_1$, $112_2$, $112_3$, and $112_4$ in the illustrated example. Although the client layer 102 is shown as including two clients 108, the metadata layer 104 is shown as including three metadata servers 110, and the block server layer 106 is shown as including four block servers 112, these examples are not intended to be limiting and in other examples, the client layer 102, the metadata layer 104, and the block server layer 106 may include any number (one or more) of clients 108, metadata servers 110, and block servers 112, respectively.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. When operating across multiple machines, the machines may communicate using a network interface, such as a local area network (LAN) or a wide area network (WAN). In some embodiments, one or more metadata servers 110 may be combined with one or more block servers 112 in a single machine. Entities in the system 100 may be virtualized entities. For example, multiple virtual block servers 112 may be included on a machine. Entities may also be included in a cluster, where computing resources of the cluster are virtualized such that the computing resources appear as a single entity.

The clients 108 include client processes that may exist on one or more physical machines. When the term "client 108" is used in the present disclosure, the action being performed may be performed by a client process. A client process is responsible for storing, retrieving, and/or deleting data in the system 100. A client process may address pieces of data depending on the nature of the storage system and the format of the data stored. For example, the client process may reference data using a client address, which may take different forms. For example, in a storage system that uses file storage, the client 108 may reference a particular volume or partition, and a file name. For object storage, the client address may be a unique object name. For block storage, the client address may be a volume or partition, and a block address. The clients 108 may communicate with the metadata layer 104 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

The block servers 112 store data for clients 108. In some embodiments, data may be broken up into one or more storage units. A storage unit may also be referred to as a data block. Data may be segmented into data blocks. Data blocks may be of a fixed size, may be initially a fixed size but compressed, or may be of a variable size. Data blocks may also be segmented based on the contextual content of the block. For example, data of a particular type may have a larger data block size compared to other types of data.

Maintaining segmentation of the blocks on a write (and corresponding re-assembly on a read) may occur in the client layer 102 and/or the metadata layer 104. Also, compression may occur in the client layer 102, the metadata layer 104, and/or the block server layer 106.

In some examples, data may be stored in a volume that is referenced by the client 108. A volume may be made up of one or more volume slices. The data associated with the volume includes a list of volume slices for that volume. A volume slice is a list of blocks for a portion of a volume. A block is the raw data for a volume and may be the smallest addressable unit of data.

The block servers 112 may store data on a storage medium. The storage medium may include different medium formats. For example, electromechanical disk storage or a solid state storage drive may be used. Electromechanical disk storage may include spinning disks that use movable read/write heads to read/write to/from different locations of the spinning disks. Inserting the read/write head at various random locations results in slower data access than if data is read from a sequential location. A solid state storage drive uses a solid state memory to store persistent data. Solid state drives may use microchips that store data in non-volatile memory chips and may contain no moving parts. Solid state drives may also perform random access and parallel reads/writes efficiently.

Data from the clients may be stored non-sequentially. In various implementations, non-sequentially storing data in storage is based upon breaking data up into one more data blocks. In addition to storing data non-sequentially, data blocks can be stored to achieve substantially even distribution across the storage system. In various examples, even distribution can be based upon a unique block identifier. For example, the data blocks may be stored in the block server layer 106 based on unique block identifiers. A block identifier may also be referred to as a content identifier and may be used interchangeably in the present disclosure.

A block identifier can be an identifier that is determined based on the content of the data block, such as by a hash of the content (e.g., a cryptographic hash function (e.g., Skein algorithm) that generates a hash value identified herein as the "block identifier"). The block identifier is unique to that block of data. For example, blocks with the same content have the same block identifier, but blocks with different content have different block identifiers. The values of possible unique identifiers can have a uniform distribution. The bin assignments may be stored in a distributed key-value store across a cluster (e.g., a cluster 302 in FIG. 3) (e.g., in a so-called "zookeeper" database as just one example). Accordingly, storing data blocks based upon the unique identifier, or a portion of the unique identifier, results in the data being stored substantially evenly across drives in the cluster. Because client data, e.g., a volume associated with the client, is spread evenly across all of the drives in the cluster, every drive in the cluster may be involved in the read and write paths of each volume. This configuration may balance the data and load across all of the drives. Such an arrangement may remove hot spots within the cluster, which can occur when the client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Because clients have their data spread substantially evenly through all the drives in the storage system, a performance of the system can be described in aggregate as a single number, e.g., the sum of performance of all the drives in the storage system.

The block servers 112 maintain a mapping between a block identifier and the location of the data block in a storage medium of block server 112. Data blocks with the same block identifiers are not stored multiple times on a block server 112 when received in multiple client write requests.

The metadata layer 104 may store metadata that maps between the client layer 102 and the block server layer 106. For example, metadata servers 110 may map between the client addressing used by the clients 108 (e.g., file names, object names, block numbers, etc.) and block layer addressing (e.g., block identifiers) used in the block server layer 106. The clients 108 may perform access based on client addresses, and block servers 112 may store data based on unique block identifiers for the data.

Figure 2:
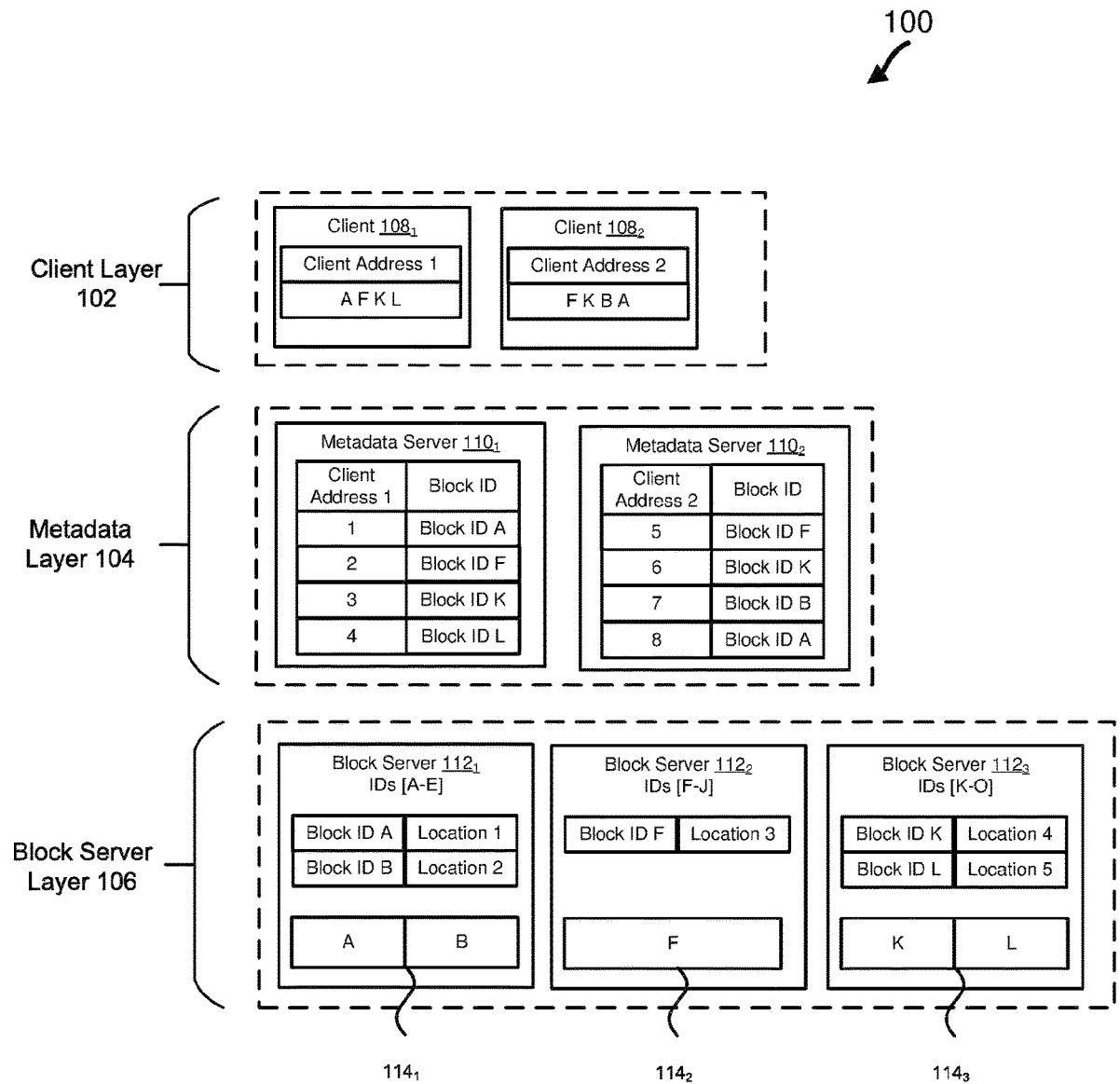
FIG. 2 illustrates a more detailed example of data storage in the system according to one or more aspects of the present disclosure.

FIG. 2 illustrates a more detailed example of data storage in the system 100 according to one or more aspects of the present disclosure. A client $108_1$ and a client $108_2$ may wish to read data from and/or write data to the distributed data storage system. For example, client $108_1$ may wish to write data to a volume at a client address 1. The client address 1 may include a target name of the volume and a list of block numbers (e.g., logical block addresses, "LBAs"). The data that client $108_1$ wishes to write may include data blocks A F, K, and Length (e.g., the content to be written).

The client $108_2$ may wish to write data at a client address 2. For example, client address 2 may reference a different volume than client address 1 and a different list of block numbers. Other formats of client addressing may also be used. For discussion purposes, the client address 1 and client address 2 may be used to reference the respective data blocks and block numbers (e.g., LBAs). The data that client $108_2$ wishes to write may include data blocks F, K, B, and A. Accordingly, data blocks A, F, and K are duplicates between the data that the client $108_1$ and the client $108_2$ wish to write.

The metadata layer 104 may include a metadata server $110_1$ and a metadata server $110_2$. Different metadata servers may be associated with different client addresses. For example, different metadata servers 110 may manage different volumes of data. In this example, metadata server $110_1$ is designated as handling client address 1, and metadata server $110_2$ is designated as handling client address 2.

For each client address, a list of block numbers may be stored. The block numbers may represent data blocks associated with the client address. For example, for client address 1, the block identifiers (also referred to as "block IDs" herein) of data blocks A, F, K, and L are stored and associated with client address 1. Each block identifier is associated with a block of data (e.g., block ID A is associated with the data block A, block ID B is associated with the data block B, etc.). Similarly, in metadata server $110_2$, the client address 2 is associated with block IDs of data blocks F, K, B, and A (e.g., block ID A for data block A, etc.).

The block server layer 106 includes block servers $112_1$, $112_2$, and $112_3$. In an example, the block servers 112 are assigned to different ranges of block identifiers. For example, block server $112_1$ may be assigned to store data for block identifiers A-E, block server $112_2$ may be assigned to store data for block identifiers F-J, and block server $112_3$ may be assigned to store data for block identifiers K-O. In this example, data for a client address may not be stored in sequential locations on a storage medium in a single block server 112. Rather, the data may be stored based on the block identifier determined from the content of the data.

The block server 112₁ stores data for block identifier A and block identifier B. Thus, in the example of FIG. 2 the block server 112₁ stores data blocks A and B, based on the corresponding block identifiers A and B. Additionally, the block server 112₁ may maintain a mapping between the block identifier and the location on the storage medium where the data associated with block identifier A is stored. For example, block identifier A may be mapped to a location 1 where data for block identifier A (e.g., data block A) is stored on block server 112₁ and block identifier B may be mapped to a location 2 where data for block identifier B (e.g., data block B) is stored on block server 112₁. Additionally, block server 112₂ stores data for block identifier F in location 2 on block server 112₂, and block server 112₃ stores data for block identifiers K and L in locations 4 and 5, respectively, in block server 112₃.

In some examples, the data blocks for a client address are not stored in sequential locations on a storage medium 114. For example, for client address 1, data block A may be stored on block server 112₁ in storage medium 114₁, data block F is stored on block server 112₂ in storage medium 114₂, and data blocks K and L are stored on block server 112₃ in storage medium 114₃. In some examples, the storage medium 114 in block server 112 may be a solid state device, such as non-volatile memory (e.g., flash memory). The solid state device may be electrically programmed and erased. The data blocks may be stored on the solid state device and persist when block server 112 is powered off. Solid state devices allow random access to data in an efficient manner and include no physical moving parts. For example, the random access is more efficient using solid state devices than if a spinning disk is used. Thus, data stored in data blocks for a client address in a non-contiguous address space and even different block servers 112 may still be accessed efficiently. In some examples, the storage medium 114 may include multiple solid state drives (e.g., flash memory drives). Each drive may store data (e.g., data blocks) for a portion of the block identifiers. Although a solid state device is described, it will be understood that spinning disks may also be used with particular embodiments.

Due to the use of the metadata server 110 to abstract the client addresses, block servers 112 may be unaware of which clients 108 are referencing which data blocks. Accordingly, it may be undesirable to allow block servers 112 to remove an overwritten or deleted block because block servers 112 do not know if other clients 108 are using this data block. Metadata server 110 has information on which data blocks are in-use by clients 108 and may communicate with block servers 112 to provide information which data blocks are in-use and which are not in-use. A data block is "in-use" if the data block is currently referenced by a client 108 and is "not in-use" if the data block is not referenced by any clients 108.

Garbage collection may refer to an algorithm that is periodically run to identify data that is no longer in-use and then delete this data. The present disclosure provides techniques for performing garbage collection in an efficient manner in system 100.

Figure 3:
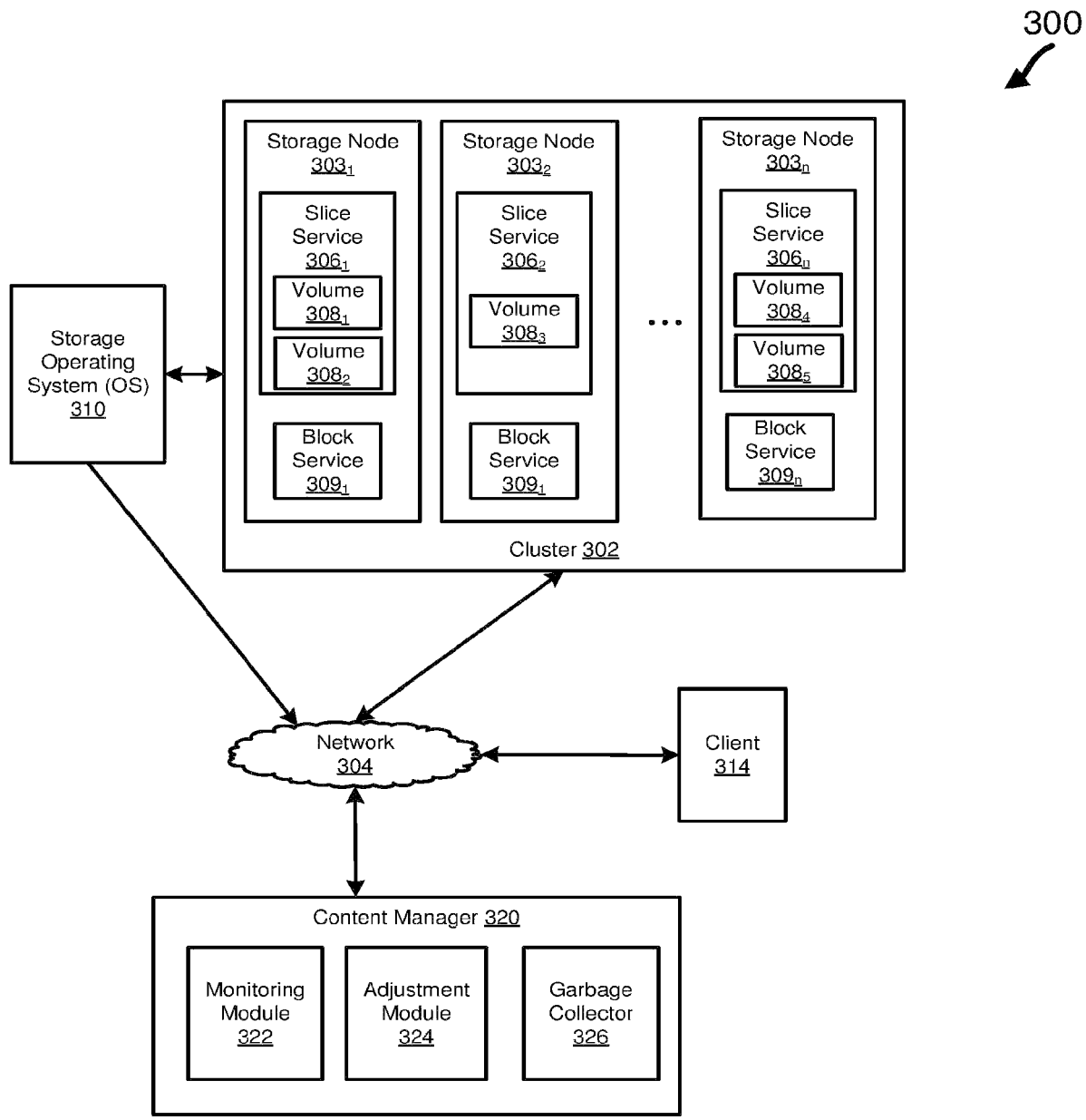
FIG. 3 illustrates a system including a cluster of storage nodes coupled to a content manager that performs garbage collection according to one or more aspects of the present disclosure.

FIG. 3 illustrates a system 300 including a cluster 302 of storage nodes 303 coupled to a content manager 320 that performs garbage collection according to one or more aspects of the present disclosure. The cluster 302 includes a plurality of storage nodes 303, and each storage node 303 may include one or more slice services 306 as well as one or more block services 309. One or more volumes 308 may be maintained by a slice service 306.

A client 314 may correspond to the client 108, the slice services 306 may correspond to the metadata server 110, and the block service 309 may correspond to the block server 112 illustrated in FIG. 1. The client 314 may store data to, retrieve data from, and/or modify data stored at the cluster 302. Each client 314 may be associated with a volume. In some examples, only one client 314 accesses data in a volume. In some examples, multiple clients 314 may access data in a single volume. The slice services 306 and/or the client 314 may break data into data blocks, such as discussed above with respect to FIGS. 1 and 2. Block services 309 and slice services 306 may maintain mappings between the client's address and the eventual physical location of the data block in respective storage media of one or more storage nodes 106. A volume includes these unique and uniformly random identifiers, and so a volume's data is also evenly distributed throughout the cluster.

The slice services 306 may store metadata that maps between clients 314 and block services 309. For example, slice services 306 may map between the client addressing used by clients 314 (e.g., file names, object names, block numbers, etc. such as LBAs) and block layer addressing (e.g., block identifiers) used in block services 309. Further, block services 309 may map between the block layer addressing (e.g., block identifiers) and the physical location of the data block on one or more storage devices. The blocks may be organized within bins maintained by the block services 309 for storage on physical storage devices (e.g., SSDs). A bin may be derived from the block ID for storage of a corresponding data block by extracting a predefined number of bits from the block identifiers introduced above.

In some embodiments, the bin may be divided into buckets or "sublists" by extending the predefined number of bits extracted from the block identifier. A bin identifier may be used to identify a bin within the system. The bin identifier may also be used to identify a particular block service 309 (e.g., block service 309₁-209ₙ in the example of FIG. 3) and associated storage device (e.g., SSD). A sublist identifier may identify a sublist with the bin, which may be used to facilitate network transfer (or syncing) of data among block services in the event of a failure or crash of a storage node. Accordingly, a client can access data using a client address, which is eventually translated into the corresponding unique identifiers that reference the client's data at the storage node 303.

The above structure allows storing of data evenly across the cluster of storage devices (e.g., SSDs). For each volume hosted by a slice service 306, a list of block identifiers may be stored with one block identifier for each logical block on the volume. Each volume may be replicated between one or more slice services 306 and/or storage nodes 303, and the slice services for each volume may be synchronized between each of the slice services hosting that volume. Accordingly, failover protection is provided in case a slice service 306 fails, such that access to each volume may continue during the failure condition.

Although parts of the system 300 are shown as being logically separate, entities may be combined in different ways. For example, functions discussed in the present disclosure may be combined into a single process or single machine (e.g., a computing device) and multiple functions or all functions may exist on one machine or across multiple machines. Additionally, when operating across multiple machines, the machines may communicate using a network interface, such as a local area network (LAN) or a wide area network (WAN). In some implementations, slice services 306 may be combined with one or more block services 309 in a single machine. Additionally or alternatively, entities in system 300 may be virtualized entities. Entities may also be included in the cluster 302, where computing resources of the cluster are virtualized such that the computing resources appear as a single entity.

In the example illustrated in FIG. 3, the cluster 302 may include a storage node $303_1$ including a slice service $306_1$, a storage node $303_2$ including a slice service $306_2$, and include a storage node $303_n$ including a slice service $306_n$. The slice service $306_1$ includes volumes $308_1$ and $308_2$, the slice service $306_2$ includes volume $308_3$, the slice service $306_n$ includes volumes $308_4$ and $308_5$. These are merely examples, and it should be understood that a storage node 303 may include any number of slice services (e.g., one or more slice services), and a slice service may include any number of volumes (e.g., one or more volumes).

Each slice service 306 may have a respective storage operating system (OS) 310. Moreover, one of the storage OS 310 may operate as a cluster manager to other slice services 306 within the cluster. Should that slice service 306 with the storage OS 310 operating as the cluster manager fail, another storage OS 310 may assume that role in its place. The storage OS 310 may track data usage per volume, per client. A client may access multiple volumes, and multiple clients may access the same volume. The storage OS 310 may store the usage information per client, per volume into a metadata datastore (which may be within main memory of a storage node 303, for example, or a storage device such as an SSD associated with a slice service 306 as another example).

As discussed above, client 314 may write data to, read data from, and/or delete data stored in the system 300. Data may be deleted from the system 300 when a client address at which the data is stored is overwritten with other data or when a client address becomes invalid (e.g., a file or object is deleted). There is not a one-to-one mapping between the client addresses and stored data blocks because multiple client addresses may have the same data block referenced by the same block identifier. It may be desirable for the system 300 to only delete data that is no longer needed. For example, a data block should not be deleted if it is being referenced by another client address.

Due to the use of the metadata server 110 to abstract the client addresses, block servers 112 may be unaware of which clients 108 are referencing which data blocks. Accordingly, it may be undesirable to allow block servers 112 to remove an overwritten or deleted block because block servers 112 do not know if other clients 108 are using this data block. Metadata server 110 has information on which data blocks are in-use by clients 108 and may communicate with block servers 112 to provide information which data blocks are in-use and which are not in-use. A data block is "in-use" if the data block is currently referenced by a client 108 and is "not in-use" if the data block is not referenced by any clients 108.

Garbage collection may refer to an algorithm that is periodically run to identify data that is no longer in-use and then delete this data. The content manager 320 may perform garbage collection on objects stored in the system 100, 300 by tracking which data blocks are in-use and/or are not in-use and accordingly deleting the data blocks that are not in-use. The content manager 320 includes a monitoring module 322, an adjustment module 324, and a garbage collector 326. The monitoring module 322 may monitor the cluster 302 and mark which data blocks are in-use (and therefore should be not deleted). The adjustment module 324 may adjust parameters related to the garbage collection to ease the workload on the cluster 302. The garbage collector 326 may delete the data blocks that are not in-use. As will be discussed further below, the content manager 320 may perform one or more rounds of garbage collection on the cluster 302.

Aspects of the content manager 320 (e.g., the monitoring module 322, the adjustment module 324, and/or the garbage collector 326) may be incorporated into the cluster 302 (e.g., storage node 303) or in the storage OS 310. In the present disclosure, reference to the content manager 320 performing an action (e.g., receiving, adjusting, performing, reducing, increasing, monitoring, transmitting, determining, storing, etc.) may refer to the storage OS 310 and/or the cluster 302 (e.g., or one or more components within the cluster 302 such as the storage node(s) 303, the slice service(s) 306, the volume(s) 308, the block service(s) 309, and the like) performing such action.

In some examples, the content manager 320 may monitor one or more bloom filters and perform, based on the one or more bloom filters, garbage collection on the cluster 302. A bloom filter is a type of bit field that may be used for membership testing. A bloom filter is a compact representation of a set of data that can be used to later test for the presence of individual elements. For example, the elements A, B, C, and D may be represented in a bloom filter. A block server 309 can test whether any of the elements are in the bloom filter. However, the bloom filter may not be used to generate the list of elements A, B, C, and D. In exchange for the reduction in size, a small possibility of an error may be introduced. For example, a small percentage chance exists that an element may appear to be present when it is in fact not. This chance of error may be controlled by, for example, selecting a size for the bloom filter based on a number of possible elements that can be stored on block service 309 and/or selecting a particular target fullness of the filter. Additionally, an error may not be fatal because the result of the error is that an element will just not be deleted when it is actually "not in-use". Accordingly, an error in which a data block is deleted when it is still being referenced by client 108 does not occur.

The slice service 306 may construct a single bloom filter including all metadata on the slice service 306 for all corresponding block services 309 or may construct multiple bloom filters for subsets of metadata on the slice service 306 for each block service 309. The more metadata that is encompassed by the bloom filter, the larger the bloom filter is, which may consume more memory and more network bandwidth to transmit. If the slice service 306 constructs multiple bloom filters (e.g., one bloom filter for each block service 309 or multiple bloom filters for each block service 309), then the slice service 306 may construct the bloom filters serially or in parallel. If the slice service 306 constructs bloom filters in parallel, more memory may be consumed, but the number of times metadata is read to build the bloom filters is reduced. Similarly, if the slice service 306 combines bloom filters before processing on block service 309, this may allow for fewer passes through the list of data blocks on block service 309, but may use larger bloom filters and more memory.

The slice services 306 may transmit one or more bloom filters to one or more block services 309, each bloom filter indicating to a block service 309 whether a particular data block referenced by the block service 309 is in-use (e.g., referenced by any clients 314). To construct a given bloom filter, for example, the slice services 306 may construct a bloom filter and initialize all entries in the bloom filter to 0. If the slice service 306 determines that a data block is in-use, the slice service 306 marks a set of entries in the bloom filter corresponding to the data block to a value of 1. In a bloom filter, a data block that is in-use is marked as in-use, and a data block that is not in-use is marked either as in-use or as not in-use. Accordingly, use of the bloom filter may provide for a false positive, but not a false negative. Each bloom filter may have a false-positive rate, as will be discussed in more detail in the present disclosure.

Figure 4:
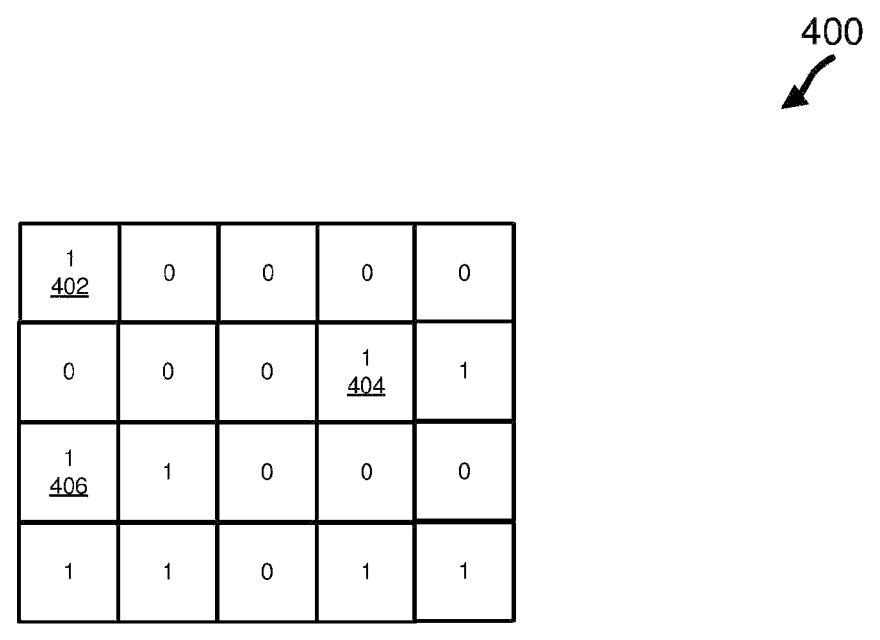

FIG. 4 illustrates an example bloom filter 400 in accordance with one or more aspects of the present disclosure. The bloom filter 400 may have various parameters, such as a size of the bloom filter (e.g., a total number of bits in the bloom filter), a target fullness of the bloom filter (e.g., a total number of bits that is set to 1), and a number of hash functions used when constructing the bloom filter.

In FIG. 4, "m" in equation (1) below may represent the number of entries. The entries may include block IDs for which "k" hash functions are computed, where "k" is provided in equation (1) above. Accordingly, the number "n" (in equation (1) below) of bits in the filter may be the number of columns (e.g., five), the number "m" of entries may be the number of rows (e.g., three) above the final row (which represents the filled Bloom filter), and the number "k" of hashes may be the maximum number of bits in a row representing a single entry set to 1 (in this case, two; the first row has only one bit set to 1 indicating that two hash functions for that entry yielded the same bit).

The bloom filter 400 includes a plurality of entries (e.g., block IDs) used to indicate whether particular data blocks are in-use or are not in-use. The bloom filter 400 includes a bit field with twenty bits (as just one example of a bloom filter), each bit having a value of 0 or 1. Although the bloom filter 400 is composed of twenty bits, other bloom filters may have more than or fewer than twenty bits. In other examples, a bloom filter may have many more bits (e.g., 130,000 bits as just one example). The bloom filter 400 may include bit values indicating which data blocks are in-use in one or more block services 309, with a 1 indicating that the corresponding data block is in-use and a 0 indicating that the data block is not in-use. As discussed above, the bloom filter 400 may have a false-positive rate referring to a data block that is marked as being is use when it is not actually in-use.

One or more entries in the bloom filter 400 may correspond to a content identifier that identifies an underlying data block referenced by a block service 309. For example, a content identifier may map to k entries (e.g., three entries) in the bloom filter 400 through k different hashing functions. In an example, the monitoring module 322 may use k hashes per content identifier and accordingly may use k hash functions when constructing the bloom filter 400, where k is a number greater than zero (e.g., one, two, three, four, or more). For example, the monitoring module 322 may scan the metadata including a set of content identifiers, and identify a particular content identifier of the set that identifies a data block.

If k is three, the particular content identifier may be an input into each of the three hash functions, with each result of the hash function mapping to an entry in the bloom filter 400. For example, a first hash function may map the particular content identifier to an entry 402 of the bloom filter 400, a second hash function may map the particular content identifier to an entry 406 of the bloom filter 400, and a third hash function may map the particular content identifier to an entry 404 of the bloom filter 400. The monitoring module 322 may accordingly set the entries 402, 404, and 406 to a value of 1, thereby indicating that the data block identified by the particular content identifier is in-use. A data block may be considered to be in-use if all entries in the bloom filter 400 corresponding to the content identifier is set to a value of 1. The monitoring module 322 may continue to scan the slice services 306 and identify additional content identifiers for filling the bloom filter 400. For example, if the monitoring module 322 identifies another content identifier in the slice service 306, the monitoring module 322 may set another three bits (if N=3) in the bloom filter to 1 until a target fullness of the filter is satisfied.

A fullness of a filter refers to a percentage of bits in the bloom filter that is set to a value of 1. For example, the bloom filter 400 has a fullness of forty-five percent because nine bits out of the twenty bits are set to a value of 1 in the bloom filter 400. The slice service 306 may determine whether a bloom filter satisfies a target fullness. A bloom filter satisfies the target fullness if, for example, the bloom filter's fullness is greater than the target fullness. The target fullness may be for, example, forty percent (as just one example of a numeric value). If a bloom filter 400 satisfies the target fullness, the slice service 306 may transmit the bloom filter to the block service 309 assigned to store data associated with the slice service 306.

The monitoring module 322 may continue to scan the cluster 302 for slice services 306, construct a new bloom filter for the slice service 306, and set values in the bloom filter as discussed in the present disclosure. In some examples, the block service 309 receives a bloom filter corresponding to every slice service 306 in the cluster 302. After receiving a bloom filter corresponding to every slice service 306 in the cluster 302, the block service 309 may mark the in-use data blocks in accordance with the received bloom filter(s).

If a large number of data blocks is marked as being in-use when they actually are not, this may lead to a high false-positive rate. A high false-positive rate may result in large amounts of unnecessary (overwritten or deleted) data remaining on a system when overwrites are occurring between rounds of garbage collection, sometimes far in excess of even the in-use data on the system. For example, if the bloom filter 400 has all bits set to 1, then all the data blocks corresponding to the bloom filter are indicated as being in-use and the false-positive rate is one hundred percent. In this scenario, the garbage collector 326 would not delete any of these data blocks. In some examples, garbage collection using bloom filters may scale badly with the size and number of nodes in the cluster 302, without direct modification of bloom filter parameters by the user.

If the false-positive rate is high, the garbage collector 326 may have a very low efficiency rate when performing garbage collection in the system because those data blocks that are incorrectly marked as being in-use (when they are not) will not be deleted from the system. The present disclosure provides techniques for reducing the false-positive rate for a round of garbage collection, potentially resulting in a higher efficiency garbage collection process.

Figure 5:
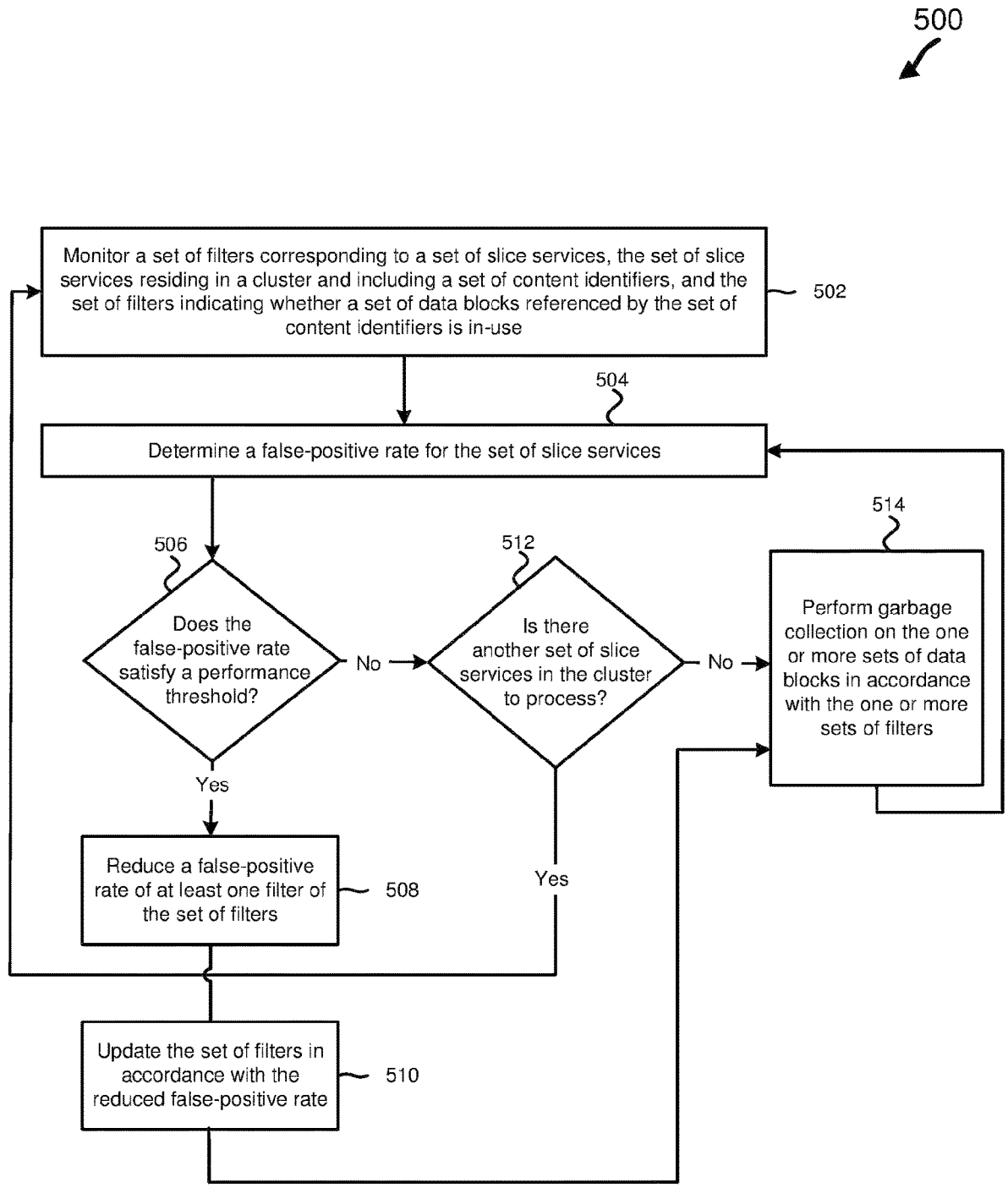
FIG. 5 illustrates a flow diagram of a method of performing garbage collection using one or more bloom filters in a distributed data storage system according to one or more aspects of the present disclosure.

FIG. 4 will be discussed relative to FIG. 5 (and vice versa) to better understand concepts related to performing garbage collection based on information in one or more bloom filters. FIG. 5 illustrates a flow diagram of a method 500 of performing garbage collection using one or more bloom filters in a distributed data storage system according to one or more aspects of the present disclosure. Blocks of the method 500 can be executed by a computing device (e.g., a processor, processing circuit, and/or other suitable component, such as of a storage node 303). For example, the slice service 306 and/or the content manager 320 (e.g., one or more components, such as the monitoring module 322, the adjustment module 324, and/or the garbage collector 326)

may execute one or more blocks of the method 500. As illustrated, the method 500 includes a number of enumerated blocks, but embodiments of the method 500 may include additional blocks before, after, and in between the enumerated blocks. In some embodiments, one or more of the enumerated blocks may be omitted or performed in a different order.

At block 502, the method 500 includes monitoring a set of filters corresponding to a set of slice services, the set of slice services residing in a cluster and including a set of content identifiers, and the set of filters indicating whether a set of data blocks referenced by the set of content identifiers is in-use. In an example, the monitoring module 322 may monitor the efficiency of a garbage collection process using one or more bloom filters. The monitoring module 322 may monitor the set of filters transmitted from the set of slice services 306 to the set of block services 309 referencing the set of data blocks.

A content identifier may be, for example, a block identifier. The filter may be a bloom filter. Although a bloom filter is discussed, other filters may be used. For example, in other examples, cache filters or extensions to bloom filters (e.g., counting bloom filters, distributed bloom filters, bloomier filters, parallel partitioned bloom filters, stable bloom filters, scalable bloom filters, spatial bloom filters, layered bloom filters, and/or attenuated bloom filters) may be used.

In some examples, the set of slice services 306 may scan the volumes hosted by the set of slice services and construct, based on the scan, bloom filters indicating which data blocks corresponding to the set of slice services are in-use. A data block corresponds to a slice service if the slice service includes a content identifier that identifies the data block.

At block 504, the method 500 includes determining a false-positive rate for the set of slice services. In some examples, the monitoring module 322 may receive the false-positive rate for the set of slice services from, for example, the slice service 306. In some examples, the monitoring module 322 may determine the false-positive rate for the set of slice services by calculating a probability of false positives for at least one filter of the set of filters. In this example, for each filter of the set of filters, the monitoring module 322 may determine the probability that a bit is not set to 1, which may be calculated in accordance with equation (1):

$$Q = (1 - 1/n)^{km}, \text{ which is equivalent to } e^{\left(-\frac{km}{n}\right)} \quad (1)$$

where Q represents the probability that a bit is not set to 1 in the filter, n represents the size of the filter array, m represents the number of entries (e.g., block IDs) in the filter, and k represents the number of hash functions corresponding to a content identifier (e.g., k>=1). Referring to equation (1), km actions of setting a bit take place, in a pseudo-random fashion in accordance with the k hash functions for m entries into the filter, each having a (1-1/n) probability of not setting a particular bit. Additionally, the adjustment module 324 may adjust the filter parameters to achieve a target fullness for individual filters or an overall round of garbage collection. The target fullness may be equal to the value of Q (e.g., as measured directly by counting the bits that are set; equation (1) amounts to a statistical prediction of this value).

The monitoring module 322 may use equation (1) to determine the false-positive rate for a filter (of the set of filters), which may be calculated in accordance with equation (2):

$$P = (1 - e^{(-km/n)})^k \quad (2)$$

where P represents the false-positive rate of a filter, n represents the size of the bloom filter array, m represents the number of entries (e.g., block IDs) in the filter, and k represents the number of hash functions corresponding to a content identifier.

The relationship between equations (1) and (2) may be expressed in accordance with equation (3):

$$P = (1 - Q)^k, \text{ which is equivalent to } (1 - e^{(-km/n)})^k \quad (3)$$

where the variables in equation (3) are defined in accordance with equations (1) and (2) above.

In some examples, the monitoring module 322 determines the false-positive rate for each filter of the set of filters and combines the false-positive rates to determine a worst-case false-positive rate for the set of slice services constructing the filters. In some examples, the monitoring module 322 may determine the worst-case false-positive rate for the cluster overall. A worst-case false-positive rate for the set of slice services may include calculating a false-positive rate for each filter independently, with an assumption that no filter in the set of filters store related data that would affect the false-positive rate for another filter in the set of filters.

At block 506, the method 500 includes determining whether the false-positive rate satisfies a performance threshold. The performance threshold may indicate a point at which, for example, the efficiency of the garbage collection process is too low or the cluster has a large amount of data stored and it may be desirable to remove the data that is not in-use. The monitoring module 322 may determine whether the false-positive rate satisfies the performance threshold. In some examples, the false-positive rate satisfies the performance threshold if the false-positive rate exceeds the performance threshold. The performance threshold may be, for example, seventy-five percent (as just one example of a numeric value) for a metadata service. The performance threshold may be, for example, ninety percent (as just one example of a numeric value) for the overall cluster.

In an example, the monitoring module 322 determines that the false-positive rate satisfies the performance threshold and in response, transmits an alert to the monitoring module 322. In this example, the monitoring module 322 may determine, based on receiving the alert, that the false-positive rate satisfies the performance threshold (e.g., the false-positive rate exceeds the performance threshold). The performance threshold may be considered a number or percentage that is high enough to warrant adjusting at least one of the filter parameters in order to reduce the false-positive rate. A trade-off may exist between reducing the false-positive rate of one or more filters and the system performance, as will be discussed further below in, for example, aspects of FIG. 7. For example, as will be discussed further below, increasing a filter size may reduce the false-positive rate, but may consume more memory, potentially resulting in degraded system performance.

If the false-positive rate for the set of slice services satisfies the performance threshold, then it may be desirable to reduce the false-positive rate of the set of slice services to improve garbage collection efficiency. In this instance, the method 500 may proceed to block 508. In contrast, if the false-positive rate for the set of slice services does not satisfy the performance threshold, then it may be unnecessary to adjust the false-positive rate of the set of slice services because garbage collection may occur with an acceptable degree of efficiency. In this instance, the method 500 may proceed to block 510.

The false-positive rate for the set of slice services may be based on a false-positive rate for each filter of the set of filters corresponding to the set of slice services. Each filter may independently have its own intrinsic false-positive rate. If the adjustment module 324 reduces a false-positive rate of a filter corresponding to the set of slice services, the false-positive rate of the set of slice services is also reduced. Similarly, if the adjustment module 324 increases a false-positive rate of a filter corresponding to the set of slice services, the false-positive rate of the set of slice services is also increased.

At block 508, the method 500 includes reducing the false-positive rate of at least one filter of the set of filters. In an example, the adjustment module 324 reduces the false-positive rate of a filter by adjust one or more parameters of the filter. A filter may have a set of parameters including, for example, a size of the filter, a target fullness of the filter, and/or a number of hashes per content identifier used for constructing the filter.

In some examples, the adjustment module 324 may reduce the false-positive rate of the filter by increasing the size of the filter (e.g., increasing the number of bits stored in the filter, identified by the parameter "n" in the equation (1) above). If the adjustment module 324 increases the filter size, then the number of filters transmitted from the set of slice services to the block services may be reduced. For example, if the adjustment module 324 increases the filter size by a power of two (e.g., from 130,000 bits to 260,000 as an example), then the number of filters transmitted from the set of slice services to the block services may be cut in half. Although increasing the filter size may improve the false-positive rate for the set of slice services, trade-offs exist between improving the false-positive rate and system performance. For example, increasing the filter size may result in a penalty in terms of memory consumption (e.g., consumes more memory) and communication (e.g., uses higher bandwidth).

In some examples, the adjustment module 324 may reduce the false-positive rate of a filter by decreasing the target fullness of the filter. If the adjustment module 324 decreases the target fullness, then the filter may reach its target fullness quicker. For example, if the slice service 306 is barely filling up a filter with 1 s, it may be desirable to decrease the target fullness of the filter to transmit filters more efficiently. A lower target fullness may correspond to a fewer number of slice services 306 and/or volumes hosted on the slice services 306. In some examples, the adjustment module 324 may reduce the false-positive rate of a filter by decreasing the size of the filter, while leaving the target fullness alone.

In some examples, the adjustment module 324 may reduce the false-positive rate of the filter by decreasing the number of hashes (e.g., identified by the parameter "k" in equation (1) above) per content identifier used for constructing the filter. If the adjustment module 324 decreases the number of hashes per content identifier used for constructing the filter, then fewer entries in the filter are used for any particular data block identified by the content identifier.

At block 510, the method 500 includes updating the set of filters in accordance with the reduced false-positive rate. The false-positive rate for the updated set of filters may be the reduced false-positive rate. Additionally, the updated set of filters may be in accordance with the adjusted set of filter parameters discussed in relation to block 508. For example, if the adjustment module 324 decreased the target fullness to reduce the false-positive rate of a filter in relation to block 508, then the filter has a target fullness of the updated target fullness. If the adjustment module 324 increased the size of a filter to reduce the false-positive rate of the filter in relation to block 508, then the filter has a size of the updated filter size. If the adjustment module 324 decreased the number of hashes per content identifier used for constructing the filter to reduce the false-positive rate of the filter in relation to block 508, then the number of hashes per content identifier used for constructing the filter is updated in accordance with the adjustment.

At block 512, the method 500 includes determining whether there is another set of slice services in the cluster to process. It may be desirable to process each of the slice services in the cluster and monitor the filters corresponding to each of these slice services to ensure that the underlying data blocks are not referenced by any of the clients in the cluster. If there is another set of slice services in the cluster to process, then the method 500 may proceed back to block 502. In contrast, if there is not another set of slice services in the cluster to process, then the method 500 may proceed to block 514.

At block 514, the method 500 includes performing garbage collection on the one or more sets of data blocks in accordance with the one or more sets of filters. The sets of filters in block 514 may refer to the set of monitored filters in block 502 or the updated set of filters in block 510. In an example, in a first round of garbage collection, the garbage collector 326 performs garbage collection on the one or more sets of data blocks. During a round garbage collection, the garbage collector 326 may remove data blocks that have been indicated as not in-use by the filter and leave those data blocks that have been indicated as in-use by the filter. After the first round of garbage collection, the garbage collector 326 may perform another round of garbage collection if the method 500 proceeds back to block 504, in which a false-positive rate for the set of filters may be determined. In this example, the false-positive rate may have been reduced in accordance with execution of the block 508.

In some examples, the monitoring module 322 may set garbage collection parameters at a single-node level or single slice-service level. The monitoring module 322 may set the garbage collection parameters in the absence of a previous round of garbage collection (e.g., at block 502) or if, for example, the metadata (e.g., list of content identifiers) has been rebalanced on the system following metadata drive addition or removal, or other conditions that may reduce the reliability of the previous round of garbage collection. The garbage collection parameters may be the parameters for a filter (e.g., size of the filter, target fullness of the filter, and/or the number of hashes per content identifier used for constructing the filter).

Figure 6:
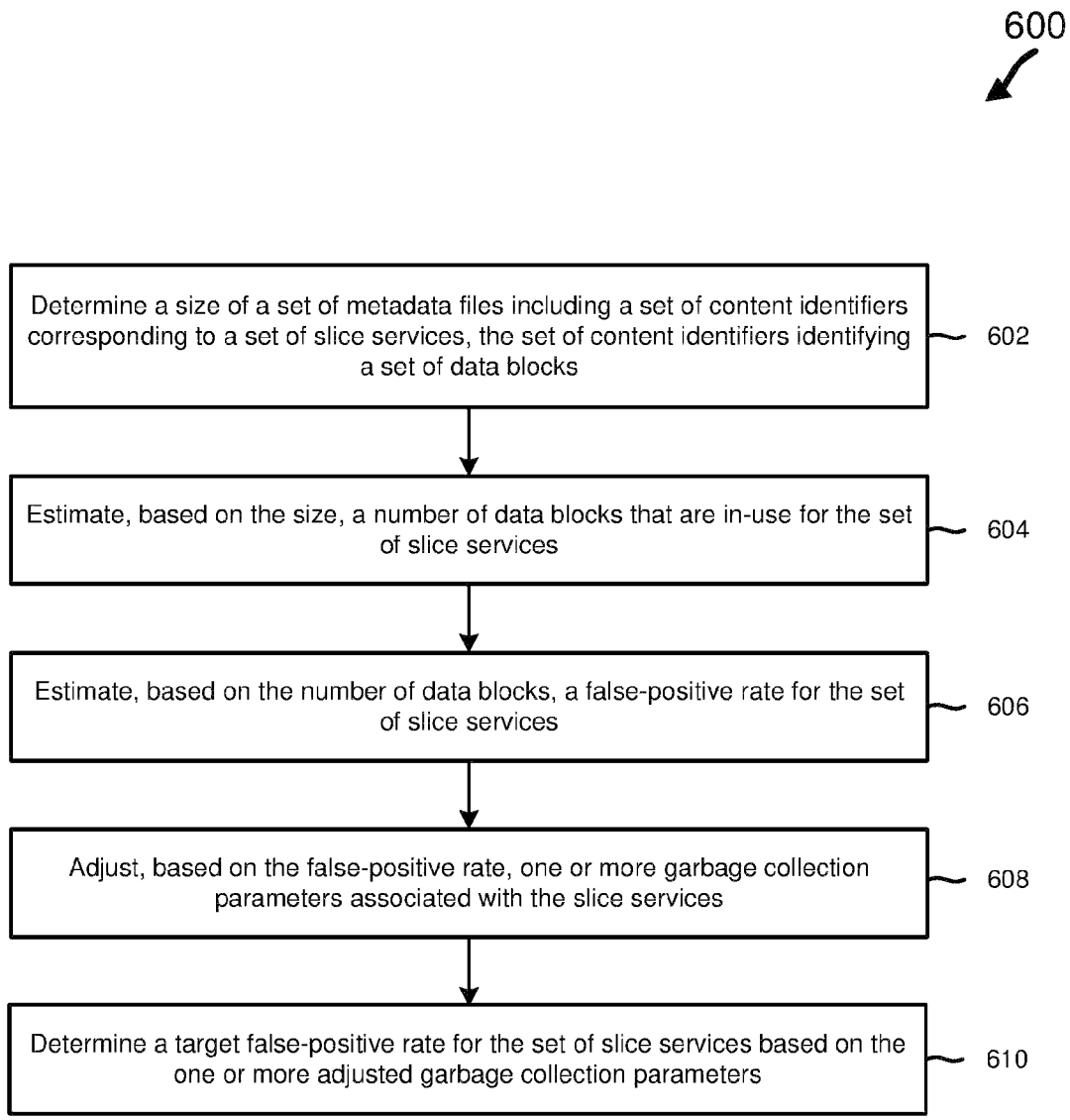
FIG. 6 illustrates a flow diagram of a method of determining a false-positive rate according to one or more aspects of the present disclosure.

FIG. 6 illustrates a flow diagram of a method 600 of determining a false-positive rate according to one or more aspects of the present disclosure. Blocks of the method 600 can be executed by a computing device (e.g., a processor, processing circuit, and/or other suitable component, such as of a storage node 303). For example, the slice service 306 and/or the content manager 320 (e.g., one or more components, such as the monitoring module 322, the adjustment module 324, and/or the garbage collector 326) may execute one or more blocks of the method 600. As illustrated, the method 600 includes a number of enumerated blocks, but embodiments of the method 600 may include additional blocks before, after, and in between the enumerated blocks. In some embodiments, one or more of the enumerated blocks may be omitted or performed in a different order.

The monitoring module 322 may determine a false-positive rate in accordance with the method 600 if, for example, it is difficult to determine the false-positive rate corresponding to a slice service. It may be difficult to determine the false-positive rate corresponding to a slice service if, for example, the slice service 306 has just started up and not enough dynamic information on the volumes hosted on the slice service 306 or the slice services 306 have been rebalanced.

At block 602, the method 600 includes determining a size of a set of metadata files including a set of content identifiers corresponding to a set of slice services, the set of content identifiers identifying a set of data blocks. In an example, the monitoring module 322 determines the size of the set of metadata files, which may correspond to the metadata layer 104 in FIGS. 1 and 2 and/or the slice services 306 in FIG. 3.

At block 604, the method 600 includes estimating, based on the size, a number of data blocks that are in-use for the set of slice services. In an example, the monitoring module 322 estimates the number of data blocks referenced by a metadata service based on the size of the metadata files.

At block 606, the method 600 includes estimating, based on the number of data blocks, a false-positive rate for the set of slice services. In an example, the monitoring module 322 may use the estimated number of data blocks to estimate a false-positive rate for the set of slice services. The monitoring module 322 may determine a number of filters will be transmitted based on the estimated number of data blocks, each filter having at least one garbage collection parameter. A garbage collection parameter may also be referred to as a filter parameter in the present disclosure. A garbage collection parameter may include, for example, a size of the filter, a target fullness of the filter, and/or a number of hashes per content identifier.

At block 608, the method 600 includes adjusting, based on the false-positive rate, one or more garbage collection parameters associated with the slice services. At block 610, the method 600 includes determining a target false-positive rate for the set of slice services based on the one or more adjusted garbage collection parameters. In an example, the monitoring module 322 may adjust a garbage collection parameter by adjusting a size of the filter, a target fullness of the filter, and/or a number of hashes per content identifier to yield the target false-positive rate determined at block 610. The target false-positive rate may be a worst-case false-positive rate (e.g., five percent) for the set of slice services.

For example, after the block 610, the process flow may proceed from the block 610 to the block 506 and so on, as discussed in relation to FIG. 5. In this example, the target false-positive rate that is determined at block 610 may be or correspond to the false-positive rate that is determined for the set of filters in block 504 in FIG. 5. For example, when executing block 506, the monitoring module 322 may determine whether the target false-positive rate determined in block 610 satisfies the performance threshold.

In some examples, the monitoring module 322 may use other conditions to adjust the false-positive rate for the set of slice services. For example, the monitoring module 322 may determine, based on whether the cluster is under stress, whether to adjust the false-positive rate.

Although bloom filters and their parameters are discussed in the present disclosure, other garbage collection parameters may be adjusted. For example, other components that identify no false negatives, but potentially false positives, may be used to determine the false-positive rate, as discussed in the present disclosure.

Figure 7:
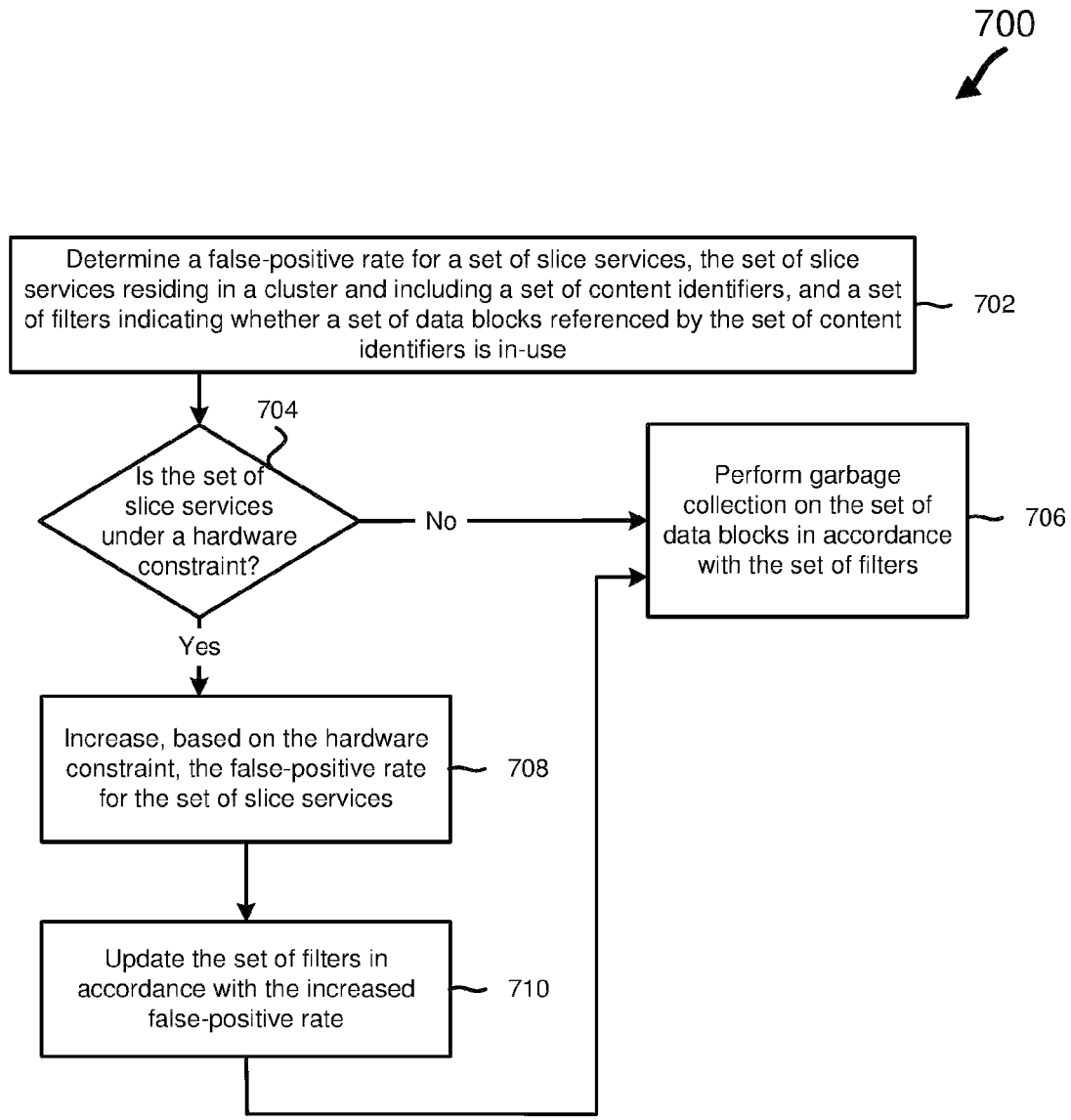
FIG. 7 illustrates a flow diagram of a method of adjusting the false-positive rate for the set of slice services based on a hardware constraint according to one or more aspects of the present disclosure.

FIG. 7 illustrates a flow diagram of a method 700 of adjusting the false-positive rate for the set of slice services based on a hardware constraint according to one or more aspects of the present disclosure. Blocks of the method 700 can be executed by a computing device (e.g., a processor, processing circuit, and/or other suitable component, such as of a storage node 303). For example, the slice service 306 and/or the content manager 320 (e.g., one or more components, such as the monitoring module 322, the adjustment module 324, and/or the garbage collector 326) may execute one or more blocks of the method 700.

At block 702, the method 700 includes determining a false-positive rate for a set of slice services, the set of slice services residing in a cluster and including a set of content identifiers, and a set of filters indicating whether a set of data blocks referenced by the set of content identifiers is in-use. In an example, the monitoring module 322 may determine the false-positive rate for the set of slice services.

At block 704, the method 700 includes determining whether the set of slice services is under a hardware constraint. In an example, the monitoring module 322 determines whether the set of slice services is under a hardware constraint. The hardware constraint indicates a condition that has been identified as being significant enough to sacrifice the efficiency of the garbage collection process in order to improve system performance. The set of slice services may be under a hardware constraint if, for example, a central processing unit (CPU), memory, or disk usage satisfies a usage threshold and/or failure to address a quality of service (QoS) setting for volumes hosted on the node is detected. In an example, the QoS setting may be a minimum input/output operations per second (IOPS) setting. The minimum TOPS setting for a volume may refer to a guaranteed number of IOPS at which the volume will perform.

In some examples, the usage threshold may be a percentage of the resources that are available. In an example, the resource includes a central processing unit (CPU), with a usage threshold of ninety percent (as just one example of a numeric value). In another example, the resource includes a memory (e.g., random access memory (RAM)), with a usage threshold of ninety percent (as just one example of a numeric value). In another example, the resource includes a persistent data storage, with a usage threshold of seventy-five percent (as just one example of a numeric value).

In some examples, the monitoring module 322 may operate in accordance with three critical stage levels (as just one example of a numeric value), with each stage indicating an increment in severity. For example, the first critical stage level indicating a warning, the second critical stage level indicating an error, and the third critical stage level indicating a critical hardware constraint. At each of the levels, the monitoring module 322 may start restricting more I/O flow, with each incremental level causing an increase in the aggressiveness. The monitoring module 322 may also reduce or turn off some internal non-critical operations. For example, when the monitoring module 322 detects that a disk is at the third critical stage level, the monitoring module 322 may reject the client write and therefore cause write failures. A disk may be considered at the third critical stage level if the usage of the disk it at, for example, eighty-five to ninety percent (as just one example of a numeric value). Before the disk reaches the third critical stage (e.g., when the monitoring module 322 detects that the disk is at the first critical stage level or the second critical stage level), however, the monitoring module 322 may adjust the one or more filter parameters such that the garbage collection process runs more aggressively to remove more data to avoid running out of space. For example, if the monitoring module 322 detects that the memory is at the first critical stage level, the monitoring module 322 may request components in the system to free up memory. In this example, the garbage collector 326 may use smaller filter sizes. Although three critical stage levels are discussed, it should be understood that the monitoring module 322 may implement any number of critical stage levels (e.g., one, three, four, or more).

If the set of slice services is not under a hardware constraint, then it may be unnecessary to adjust the false-positive rate. In this instance, the method 700 may proceed to block 706. At block 706, the method 700 includes performing garbage collection on the set of data blocks in accordance with the set of filters. In an example, the garbage collector 326 performs garbage collection on the set of data blocks in accordance with the set of filters in block 702. For example, the garbage collector 326 may remove those data blocks of the set of data blocks that are not marked as in-use in the filter (e.g., not referenced by any client) and leave those data blocks of the set of data blocks that are marked as in-use in the filter.

In contrast, if the set of slice services is under a hardware constraint, then it may be desirable to increase the false-positive rate for the set of slice services to avoid a conflict between the garbage collection process and other storage processes. In this instance, the method 700 may proceed to block 708.

At block 708, the method 700 includes increasing, based on the hardware constraint, the false-positive rate for the set of slice services. The false-positive rate for the set of slice services may be based on a false-positive rate for each filter of the set of filters corresponding to the set of slice services. If the adjustment module 324 reduces a false-positive rate of a filter corresponding to the set of slice services, the false-positive rate of the set of slice services is also reduced. Similarly, if the adjustment module 324 increases a false-positive rate of a filter corresponding to the set of slice services, the false-positive rate of the set of slice services is also increased.

In an example in relation to block 708, the adjustment module 324 may increase, based on the hardware constraint, the false-positive rate for the set of slice services by adjusting one or more parameters of a filter of the set of filters. In some examples, the adjustment module 324 increases the false-positive rate of a filter by increasing the target fullness of the filter. If the adjustment module 324 increases the target fullness, then the filter may correspond to a greater number of slice services 306 and/or volumes hosted on the slice services 306. Although the adjustment module 324 may end up transmitting fewer filters to the block service 309 overall, the false-positive rate of the filter will be increased. In some examples, the adjustment module 324 increases the false-positive rate of the filter by decreasing the size of the filter (e.g., decreasing the number of bits stored in the filter). In some examples, the adjustment module 324 increases the false-positive rate of the filter by increasing the number of hashes per content identifier used for constructing the filter. By increasing the number of hashes, the number of entries in the filter corresponding to a block service 309 is also reduced.

A relationship may exist between the false-positive rate and the hardware resources. For example, increasing the false-positive rate for the set of slice services may result in the garbage collection process running less efficiently, but may also reduce the allocation of random access memory (RAM) for filters. The increased false-positive rate discussed in relation to block 708 in FIG. 7 may correspond to the reduced false-positive rate of at least one filter discussed in relation to block 508 or the target false-positive rate discussed in relation to block 610 in FIG. 6.

At block 710, the method 700 includes updating the set of filters in accordance with the increased false-positive rate. In an example, the adjustment module 324 may update the set of filters in accordance with the adjustment of the filter parameters, as discussed in relation to block 708. After the set of filters is updated, the method 700 may proceed to block 706.

As illustrated, the method 700 includes a number of enumerated blocks, but embodiments of the method 700 may include additional blocks before, after, and in between the enumerated blocks. In some embodiments, one or more of the enumerated blocks may be omitted or performed in a different order. For example, after the set of filters is updated, the monitoring module 322 may determine whether the set of slice services is under a hardware constraint. If the monitoring module 322 determines that the set of slice services is no longer under a hardware constraint, the adjustment module 324 may return the false-positive rate for the set of slice services, which was increased in the block 708, to the determined false-positive rate, as discussed in relation to block 702. In this way, the adjustment module 324 may temporarily increase the false-positive rate for a particular metadata service in order to avoid a conflict between the garbage collection processes and other storage processes. Because the increase to the false-positive rate was triggered by the hardware constraint, the adjustment module 324 may return the false-positive rate back to its initial value in response to the set of slice services no longer being under the hardware constraint.

In some examples, the content manager 320 may execute one or more blocks included in the methods 500, 600, and/or 700 in a sequential manner. For example, after the content manager 320 executes the block 510 of method 500, the content manager 320 may execute the blocks 704, 708, and/or 710, before reverting back to the method 500 at block 512. The content manager 320 may execute the method 700 and prioritize garbage collection or back-off on how aggressive it is under certain conditions. For example, the content manager 320 may execute the method 700 if the false-positive rate does not satisfy the performance threshold (e.g., it is unnecessary to reduce the false-positive rate of the set of slice services), as discussed in relation to block 516 in FIG. 5. Accordingly, if the content manager 320 determines that there is a large amount of data that is not in-use (e.g., the client continues to write new data and then delete it) and should be cleared out though the garbage collection process, the content manager 320 may prioritize garbage collection and its efficiency to clear the cluster. In this example, the content manager 320 may adjust the garbage collection parameters to be more aggressive and efficient, which may come at the cost of system performance in other areas (e.g., memory consumption). If the content manager 320 determines that the false-positive rate does not satisfy the performance threshold (e.g., indicates an acceptable efficiency level for the garbage collection process) and determines that the set of slice services is under a hardware constraint, the content manager 320 may increase the false-positive rate for the set of slice services. In this example, the false-positive rate may be low enough that the false-positive rate can be increased in order to avoid a conflict between the garbage collection process and other storage processes.

Figure 8:
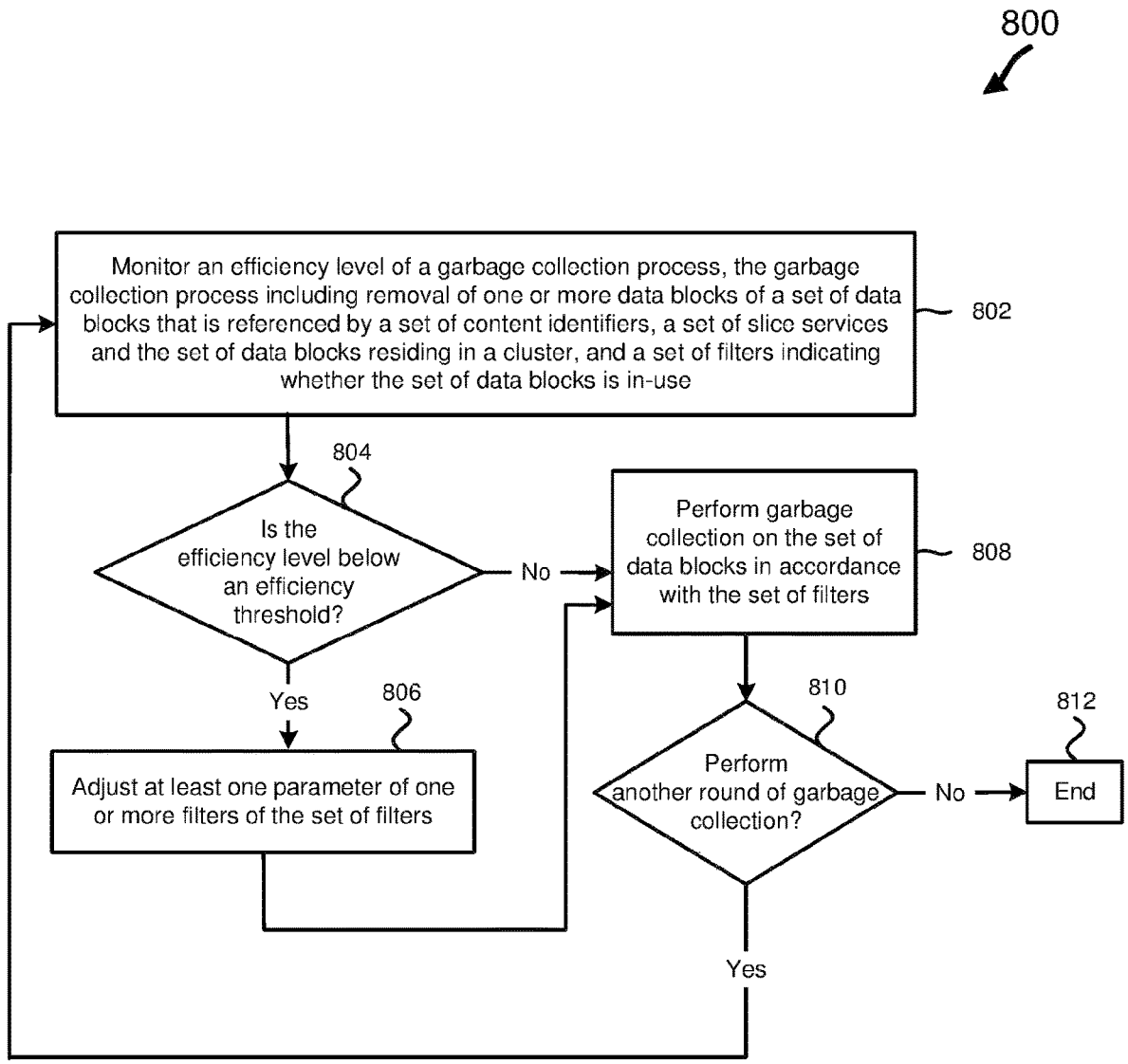
FIG. 8 illustrates a flow diagram of a method of performing garbage collection in a distributed data storage system according to one or more aspects of the present disclosure.

FIG. 8 illustrates a flow diagram of a method 800 of performing garbage collection in a distributed data storage system according to one or more aspects of the present disclosure. Blocks of the method 800 can be executed by a computing device (e.g., a processor, processing circuit, and/or other suitable component, such as of a storage node 303). For example, the slice service 306 and/or the content manager 320 (e.g., one or more components, such as the monitoring module 322, the adjustment module 324, and/or the garbage collector 326) may execute one or more blocks of the method 800. As illustrated, the method 800 includes a number of enumerated blocks, but embodiments of the method 800 may include additional blocks before, after, and in between the enumerated blocks. In some embodiments, one or more of the enumerated blocks may be omitted or performed in a different order.

At block 802, the method 800 includes monitoring an efficiency level of a garbage collection process, the garbage collection process including removal of one or more data blocks of a set of data blocks that is referenced by a set of content identifiers, a set of slice services and the set of data blocks residing in a cluster, and a set of filters indicating whether the set of data blocks is in-use. The monitoring module 322 may monitor the efficiency level of the garbage collection process by, for example, using bloom filters (see, e.g., FIG. 5) or using efficiency sets.

Figure 9:
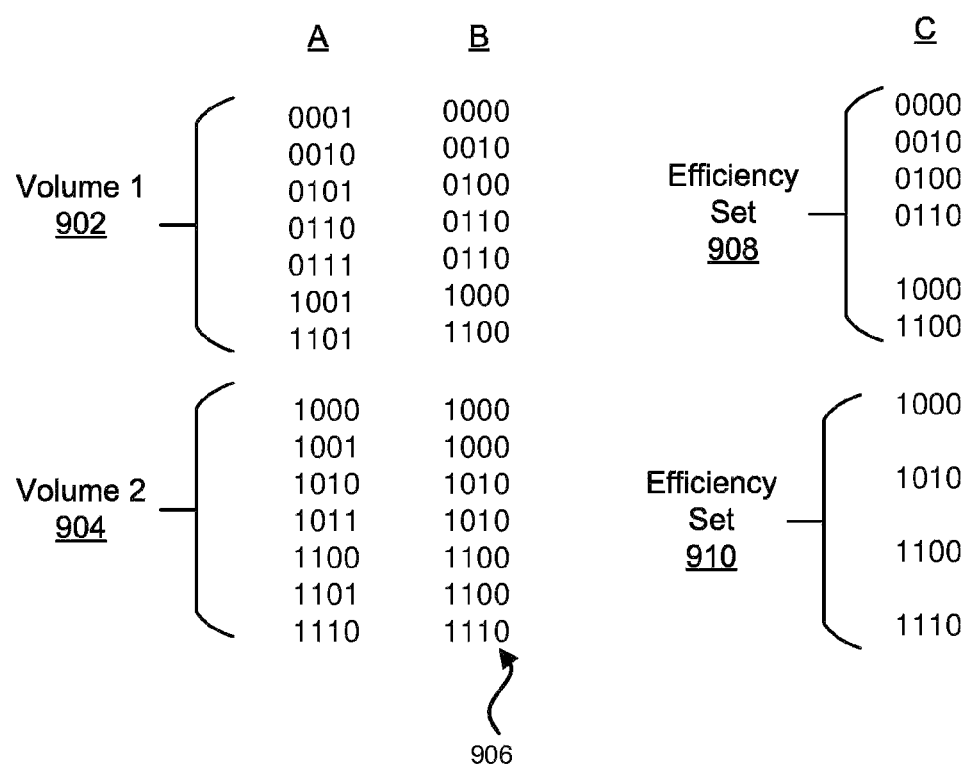
FIG. 9 illustrates example efficiency sets in accordance with one or more aspects of the present disclosure.

FIG. 9 illustrates example efficiency sets in accordance with one or more aspects of the present disclosure. Efficiency sets 908 and 910 may be generated from groups of block identifiers 902 and 904 of a first and second volume, respectively. For explanatory purposes, block identifiers are shown as 4-digit binary numbers. However, any of the block identifiers as described herein may be utilized.

Accordingly, in column A, the sets of block identifiers 902 and 904 each includes the block identifiers for the corresponding volume. In other words, the block identifiers of group 902 correspond to the data blocks of the first volume. The block identifiers of group 904 correspond to the data blocks of the second volume. In column B, a bitmask 906 has been applied to block identifier groups 902 and 904 such that the least significant bit of the block identifiers is masked to become "0" (i.e., a bitwise AND of the value "0" has been applied to the first digit of each identifier). The scope of the present disclosure is not limited to a particular type of mask to be applied to groups of block identifiers. For example, any one of the bits of the binary representation of a block identifier may be masked to be set on or off, and multiple bits may be masked at the same time. In an illustrative implementation, the type of mask to be applied may be selected based on the desired probability of accuracy (e.g., confidence) an administrator desires in a resulting efficiency set and in calculations using the efficiency set. For example, as more bits are masked, the effective level of precision of the bit identifiers is reduced, and the probability that the group of masked bit identifiers is an accurate representation of volume data is reduced.

After bitmask 906 has been applied, the resulting efficiency sets 908 and 910 may be seen with reference to column C. As depicted, the application of bitmask 906 to block identifiers group 902 resulted in a reduced set of masked identifiers as compared to the entire group of block identifiers. For example, block identifier "0111" of group 902 was masked to become "0110," which was a duplicate entry in group 902, column B. As a result, the efficiency set 908 may store one instance of "0110", and the duplicate entry of "0110" may be removed. Because of this, the memory footprint used to store efficiency set 908 is less than that of block identifier group 902, because fewer entries are stored (i.e., six entries in efficiency set 908 of volume 1 as compared to seven entries in block identifier group 902 for volume 1).

Additionally or alternatively, the bitmask 906 may also be applied to block identifier group 904 (i.e. the block identifiers corresponding to the second volume). As a result of applying the bitmask 906, efficiency set 910 is formed for the second volume, which includes four entries, as compared to the seven entries in group 904.

The content manager 320 may estimate, based on a number of entries in an efficiency set for a volume, an amount of data that is in-use for the volume. For example, for each block identifier included in the efficiency set, the content manager 320 may determine an amount of data that is referenced by the block identifier. To determine an amount of data that is in-use in the cluster, the content manager 320 may continue to perform these calculations for each volume hosted on a slice service and further for each slice service in the cluster.

In some examples, the content manager 320 may create each efficiency set by scanning all block IDs from a data volume, applying a membership test (e.g., applying the bitmask), and adding those block IDs that passed the membership test. The membership test may become stricter as the scan proceeds, applying retroactively to previously admitted block IDs. The size of the set of block IDs at the end of the scan may represent a fraction of the total number of data blocks in the system referenced by that volume (or, equivalently, by a collection of volumes, if that scan extends over multiple volumes), and that fraction may be determined by the membership test (e.g., the bitmask). The content manager 320 may multiply by the inverse of that fraction, yielding a statistical estimate of the total number of unique data blocks referenced by the volume (or set of volumes). The total number of unique data blocks may be the estimated amount of data that is in-use for the volume, as discussed in relation to FIGS. 8 and 9.

Referring back to block 804 in FIG. 8, the method 800 includes determining whether an efficiency level is below an efficiency threshold. If the efficiency level is not below the efficiency threshold, then it may be unnecessary to adjust a parameter of a filter of the set of filters. In this instance, the method 800 may proceed to block 808. In contrast, if the efficiency level is below the efficiency threshold, then it may be desirable to adjust a parameter of a filter of the set of filters in order to improve the efficiency level of the garbage collection process.

In some examples, if the monitoring module 322 monitors the efficiency level of the garbage collection process by, for example, using bloom filters, the monitoring module 322 may determine that the efficiency level is below the efficiency threshold if the false-positive rate for the set of slice services satisfies the performance threshold, as discussed in relation to block 506 in FIG. 5. The false-positive rate for the set of slice services may satisfy the performance threshold if, for example, the false-positive rate exceeds the performance threshold.

In some examples, the monitoring module 322 monitors the efficiency level of the garbage collection process by, for example, using efficiency sets. The monitoring module 322 may determine that the efficiency level is below the efficiency threshold if a difference between an amount of data stored by a set of block services (e.g., block services 309 in FIG. 3) corresponding to the data blocks and an estimated amount of data blocks in-use in the cluster is greater than a critical value. For example, the critical value may be ten percent of the overall cluster capacity. A block service corresponds to a data block if the block service stores a mapping from a block identifier to a location of the data block.

If the efficiency level is below the efficiency threshold, the method 800 may proceed to block 806. At block 806, the method 800 includes adjusting at least one parameter of one or more filters of the set of filters. In an example, the adjustment module 324 may adjust a filter parameter to increase the efficiency level of the garbage collection process. The adjustment module 324 may increase the efficiency level of the garbage collection process by reducing a false-positive rate of at least one filter of the set of filters, as discussed in relation to aspects of FIG. 5.

At block 808, the method 800 includes performing garbage collection on the set of data blocks in accordance with the set of filters. During a round garbage collection, the garbage collector 326 may remove data blocks that have been indicated as not in-use by the filter and leave those data blocks that have been indicated as in-use by the filter.

At block 810, the method 800 includes determining whether to perform another round of garbage collection. The garbage collector 326 may determine whether to perform another round of garbage collection. If the garbage collector 326 determines to perform another round of garbage collection, then the method 800 may proceed back to block 802. In contrast, if the garbage collector 326 determines to not perform another round of garbage collection, then the method 800 may proceed to block 812. At block 812, the method 800 ends.

The present embodiments can take the form of an entirely hardware embodiment, an entirely software embodiment, or an embodiment containing both hardware and software elements. Accordingly, it is understood that any operation of the computing systems of computing architecture 100 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

Thus, the present disclosure provides a system, method, and machine-readable storage medium for performing garbage collection in a distributed storage system. In some embodiments, the method includes monitoring an efficiency level of a garbage collection process, the garbage collection process including removal of one or more data blocks of a set of data blocks that is referenced by a set of content identifiers, a set of slice services and the set of data blocks residing in a cluster, and a set of filters indicating whether the set of data blocks is in-use; determining whether the efficiency level is below an efficiency threshold; adjusting at least one parameter of the one or more filters of the set of filters in response to determining that the efficiency level is below the efficiency threshold; and performing garbage collection on the set of data blocks in accordance with the set of filters.

In some examples, monitoring the efficiency level includes monitoring the set of filters. In some examples, monitoring the efficiency level includes determining an efficiency set for each volume hosted by a slice service of the set of slice services. In some examples, the set of filters includes a set of bloom filters. In some examples, at least one parameter of the one or more filters includes a size of the filter, a target fullness of the filter, and a number of hash functions used when constructing the filter. In some examples, determining whether the efficiency level is below the efficiency threshold includes determining whether a false-positive rate for the set of slice services exceeds a performance threshold. In some examples, determining whether the efficiency level is below the efficiency threshold includes determining whether a difference between an amount of data stored by a set of block services corresponding to the set of data blocks and an estimated amount of data block in-use in the cluster is greater than a critical value. In some examples, adjusting at least one parameter includes reducing a false-positive rate of a filter of the set of filters. In some examples, monitoring the efficiency level, determining whether the efficiency level is below the efficiency threshold, adjusting at least one parameter, and performing garbage collection occurs for each round of garbage collection. In some examples, adjusting a parameter of a filter of the set of filters is in response to determining that the set of slice services is under a hardware constraint. In some examples, adjusting at least one parameter includes increasing a size of a filter of the one or more filters, decreasing a target fullness of the filter, or decreasing a number of hashes per content identifier used for constructing the filter.

In yet further embodiments, the non-transitory machine-readable medium has instructions for performing garbage collection in a distributed storage system, including machine executable code which when executed by at least one machine, causes the machine to: monitor a set of filters corresponding to a set of slice services, the set of slice services residing in a cluster and including a set of content identifiers, and the set of filters indicating whether a set of data blocks referenced by the set of content identifiers is in-use; determine whether a false-positive rate for the set of slice services satisfies a performance threshold; adjust the false-positive rate of at least one filter of the set of filters in response to determining that the false-positive rate satisfies the performance threshold; and performing garbage collection on the set of data blocks in accordance with the set of filters.

In some examples, the false-positive rate satisfies the performance threshold if the false-positive rate exceeds the performance threshold. In some examples, the false-positive rate is based on the set of filters. In some examples, the non-transitory machine-readable medium further includes code, which causes the machine to update the set of filters in accordance with the adjusted false-positive rate, where the garbage collection is performed in accordance with the updated set of filters. In some examples, the non-transitory machine-readable medium further includes code, which causes the machine to adjust the false-positive rate by reducing the false-positive rate of a filter of the set of filters.

In yet further embodiments, a computing device includes a memory containing a machine-readable medium comprising machine executable code having stored thereon instructions for performing garbage collection in a distributed storage system; and a processor coupled to the memory. The processor is configured to execute the machine executable code to, for each round of garbage collection: monitor an efficiency level of a garbage collection process for a set of data blocks referenced by a set of content identifiers, the set of data blocks residing in a cluster, and a set of filters indicating whether the set of data blocks is in-use; determine whether the efficiency level is below an efficiency threshold; reduce a false-positive rate of a filter of the set of filters; and perform garbage collection on the set of data blocks in accordance with the set of filters.

In some examples, the processor is configured to execute the machine executable code to reduce the false-positive rate of the filter by increasing a size of the filter. In some examples, the processor is configured to execute the machine executable code to reduce the false-positive rate of the filter by decreasing a target fullness of the filter. In some examples, the processor is configured to execute the machine executable code to reduce the false-positive rate of the filter by decreasing a number of hashes per content identifier used for constructing the filter.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
managing, by each of a plurality of metadata services of a distributed storage system, a set of block identifiers (IDs) for data blocks of a volume hosted by a respective storage node of a plurality of storage nodes of the distributed storage system;
maintaining, for each metadata service of the plurality of metadata services, a probabilistic filter containing information indicative of those of the data blocks that are in use;
monitoring an efficiency level of a garbage collection process performed by the distributed storage system by calculating and combining a plurality of false-positive rates (FPRs), wherein a given FPR of the plurality of FPRs represents an estimated FPR of the probabilistic filter of a given metadata service of the plurality of metadata services that is independently determined based on a set of parameters of the probabilistic filter, and wherein for a particular round of the garbage collection process during which the distributed storage system is in a particular state, the efficiency level of the garbage collection process is calculated based upon an efficiency set determined for the volume; and
responsive to determining the efficiency level is below an efficiency threshold:
updating the probabilistic filter of a particular metadata service of the plurality of metadata services to increase the efficiency level by adjusting at least one parameter of the set of parameters of the probabilistic filter of the particular metadata service; and
performing a subsequent round of the garbage collection process on the data blocks of the volume managed by the particular metadata service based on the updated probabilistic filter.

2. The method of claim 1, wherein said monitoring the efficiency level is performed for each round of the garbage collection process.

3. The method of claim 1, wherein the particular state relates to an amount of dynamic information on the volume or is indicative of the set of block IDs managed by one or more metadata services of the plurality of metadata services having been rebalanced.

4. The method of claim 1, wherein the combined plurality of FPRs are used to determine a worst-case FPR for the plurality of metadata services and wherein the efficiency level has an inverse relationship with the worst-case FPR.

5. The method of claim 1, wherein the probabilistic filter maintained for each metadata service of the plurality of metadata services comprises a Bloom filter, a counting Bloom filter, a distributed Bloom filter, a Bloomier filter, a parallel partitioned Bloom filter, a stable Bloom filter, a scalable Bloom filter, a spatial Bloom filter, a layered Bloom filter, or an attenuated Bloom filter.

6. A non-transitory machine readable medium storing instructions, which when executed by a processing resource of a distributed storage system, cause the distributed storage system to:
manage, by each of a plurality of metadata services of the distributed storage system, a set of block identifiers (IDs) for data blocks of a volume hosted by a respective storage node of a plurality of storage nodes of the distributed storage system;
maintain, for each metadata service of the plurality of metadata services, a probabilistic filter containing information indicative of those of the data blocks that are in use;
monitor an efficiency level of a garbage collection process performed by the distributed storage system by calculating and combining a plurality of false-positive rates (FPRs), wherein a given FPR of the plurality of FPRs represents an estimated FPR of the probabilistic filter of a given metadata service of the plurality of metadata services that is independently determined based on a set of parameters of the probabilistic filter, and wherein for a particular round of the garbage collection process during which the distributed storage system is in a particular state, the efficiency level of the garbage collection process is calculated based upon an efficiency set determined for the volume; and
responsive to determining the efficiency level is below an efficiency threshold:
update the probabilistic filter of a particular metadata service of the plurality of metadata services to increase the efficiency level by adjusting at least one parameter of the set of parameters of the probabilistic filter of the particular metadata service; and
perform a subsequent round of the garbage collection process on the data blocks of the volume managed by the particular metadata service based on the updated probabilistic filter.

7. The non-transitory machine readable medium of claim 6, wherein the at least one parameter comprises a size, a target fullness of the probabilistic filter, or a number of hash functions used when constructing the probabilistic filter.

8. The non-transitory machine readable medium of claim 6, wherein the efficiency level is monitored for each round of the garbage collection process.

9. The non-transitory machine readable medium of claim 6, wherein the particular state relates to an amount of dynamic information on the volume or is indicative of the set of block IDs managed by one or more metadata services of the plurality of metadata services having been rebalanced.

10. The non-transitory machine readable medium of claim 6, wherein the combined plurality of FPRs are used to determine a worst-case FPR for the plurality of metadata services.

11. The non-transitory machine readable medium of claim 10, wherein the efficiency level has an inverse relationship with the worst-case FPR.

12. The non-transitory machine readable medium of claim 11, wherein the efficiency level is calculated by subtracting the worst-case FPR from 100.

13. The non-transitory machine readable medium of claim 6, wherein the probabilistic filter maintained for each metadata service of the plurality of metadata services comprises a Bloom filter, a counting Bloom filter, a distributed Bloom filter, a Bloomier filter, a parallel partitioned Bloom filter, a stable Bloom filter, a scalable Bloom filter, a spatial Bloom filter, a layered Bloom filter, or an attenuated Bloom filter.

14. A distributed storage system comprising:
a processor; and
a non-transitory computer-readable medium, coupled to the processor, having stored therein instructions that when executed by the processor cause the distributed storage system to:
manage, by each of a plurality of metadata services of the distributed storage system, a set of block identifiers (IDs) for data blocks of a volume hosted by a respective storage node of a plurality of storage nodes of the distributed storage system;
maintain, for each metadata service of the plurality of metadata services, a probabilistic filter containing information indicative of those of the data blocks that are in use;
monitor an efficiency level of a garbage collection process performed by the distributed storage system by calculating and combining a plurality of false-positive rates (FPRs), wherein a given FPR of the plurality of FPRs represents an estimated FPR of the probabilistic filter of a given metadata service of the plurality of metadata services that is independently determined based on a set of parameters of the probabilistic filter, and wherein for a particular round of the garbage collection process during which the distributed storage system is in a particular state, the efficiency level of the garbage collection process is calculated based upon an efficiency set determined for the volume; and
responsive to determining the efficiency level is below an efficiency threshold:
update the probabilistic filter of a particular metadata service of the plurality of metadata services to increase the efficiency level by adjusting at least one parameter of the set of parameters of the probabilistic filter of the particular metadata service; and
perform a subsequent round of the garbage collection process on the data blocks of the volume managed by the particular metadata service based on the updated probabilistic filter.

15. The distributed storage system of claim 14, wherein the at least one parameter comprises a size, a target fullness of the probabilistic filter, or a number of hash functions used when constructing the probabilistic filter.

16. The distributed storage system of claim 14, wherein the efficiency level of the garbage collection process is monitored for each round of the garbage collection process.

17. The distributed storage system of claim 14, wherein the particular state relates to an amount of dynamic information on the volume or is indicative of the set of block IDs managed by one or more metadata services of the plurality of metadata services having been rebalanced.

18. The distributed storage system of claim 15, wherein the combined plurality of FPRs are used to determine a worst-case FPR for the plurality of metadata services and wherein the efficiency level has an inverse relationship with the worst-case FPR.

19. The distributed storage system of claim 15, wherein the probabilistic filter maintained for each metadata service of the plurality of metadata services comprises a Bloom filter, a counting Bloom filter, a distributed Bloom filter, a Bloomier filter, a parallel partitioned Bloom filter, a stable Bloom filter, a scalable Bloom filter, a spatial Bloom filter, a layered Bloom filter, or an attenuated Bloom filter.

* * * * *